United States Patent
Sims

(10) Patent No.: US 9,459,068 B2
(45) Date of Patent: Oct. 4, 2016

(54) VIBRATION DECAY TIME MODIFICATION

(75) Inventor: Steven C. Sims, Shelton, WA (US)

(73) Assignee: Sims Vibration Laboratory, Inc., Shelton, WA (US)

( * ) Notice: Subject to any disclaimer, the term of this patent is extended or adjusted under 35 U.S.C. 154(b) by 164 days.

(21) Appl. No.: 13/374,445

(22) Filed: Dec. 29, 2011

(65) Prior Publication Data

US 2012/0167864 A1      Jul. 5, 2012

Related U.S. Application Data

(60) Provisional application No. 61/460,569, filed on Jan. 5, 2011.

(51) Int. Cl.
| | |
|---|---|
| *F16M 1/00* | (2006.01) |
| *F41B 5/14* | (2006.01) |
| *F16F 1/373* | (2006.01) |
| *F41C 27/22* | (2006.01) |

(52) U.S. Cl.
CPC ............. *F41B 5/1426* (2013.01); *F16F 1/373* (2013.01); *F41C 27/22* (2013.01)

(58) Field of Classification Search
CPC ....... F16F 15/02; F16F 1/373; F41B 5/1426; F41B 5/14; F41B 5/1442; F41B 5/1449; F41C 27/22
USPC ................ 267/136, 137; 124/23.1, 86, 89; D22/100, 107–110
See application file for complete search history.

(56) References Cited

U.S. PATENT DOCUMENTS

| | | | | |
|---|---|---|---|---|
| 5,362,046 | A * | 11/1994 | Sims | 473/300 |
| 6,298,842 | B1 * | 10/2001 | Sims | 124/89 |
| 6,382,201 | B1 * | 5/2002 | McPherson et al. | 124/89 |
| 6,712,059 | B2 * | 3/2004 | Donovan | 124/89 |
| 6,745,757 | B2 * | 6/2004 | Sims | 124/89 |
| 6,758,205 | B2 * | 7/2004 | Kronfeld | 124/89 |
| D498,279 | S * | 11/2004 | Sims | D21/759 |
| 6,910,472 | B2 * | 6/2005 | Mizek et al. | 124/89 |
| D514,654 | S * | 2/2006 | Sims | D22/107 |
| D559,937 | S * | 1/2008 | Sims et al. | D22/107 |
| D584,375 | S * | 1/2009 | Sims | D22/107 |
| 8,141,548 | B2 * | 3/2012 | Leven | 124/89 |

* cited by examiner

*Primary Examiner* — Pamela Rodriguez
(74) *Attorney, Agent, or Firm* — Wells St. John, P.S.

(57) ABSTRACT

Vibration dampeners (DTM's) designed to surround a device in which unwanted vibrations (including shocks) are set up during use or a component of the device. The DTM significantly shortens the duration of those vibrations, reducing sound levels, making the device more comfortable to use in wielded instrument applications of the invention, and/or significantly reducing the possibility that the vibrations might damage the device. A representative, but significant, use of the subject DTM's is to dampen the vibrations generated when an arrow (or bolt) is shot from a crossbow.

22 Claims, 11 Drawing Sheets

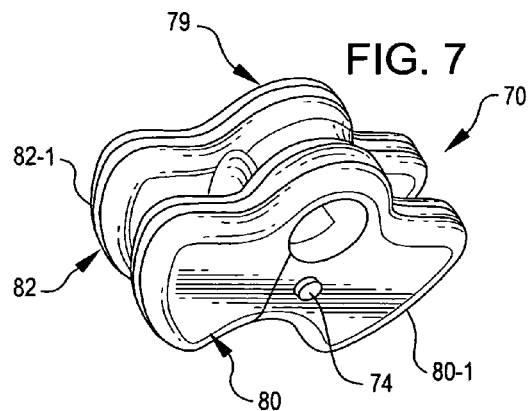
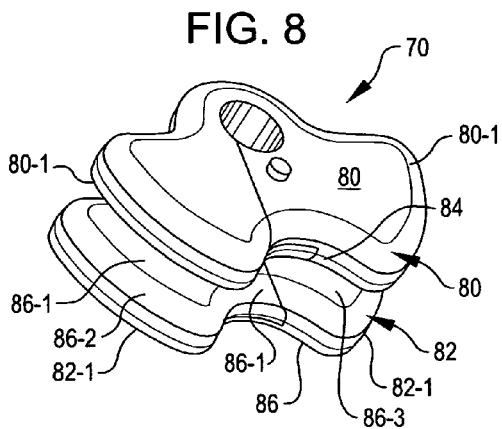
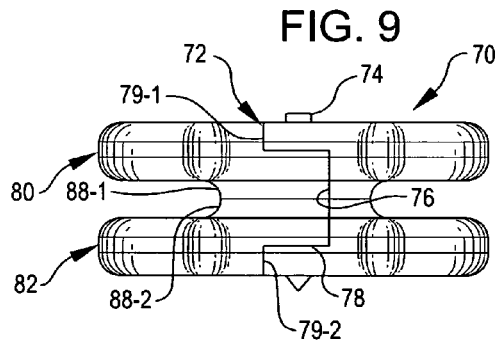
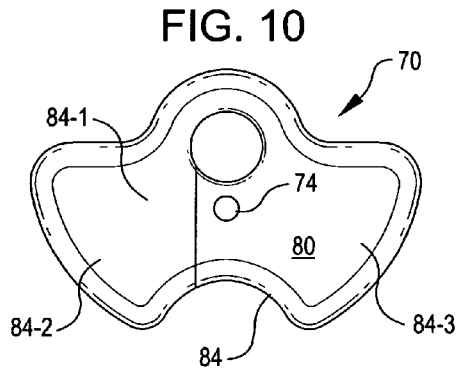
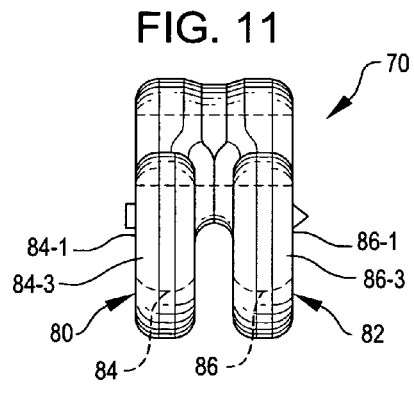
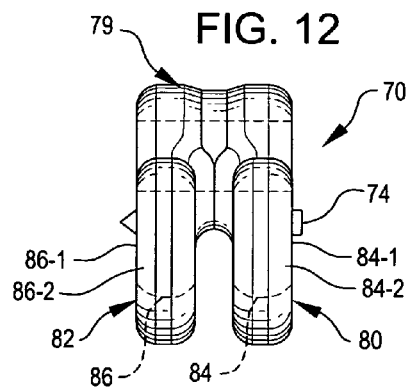
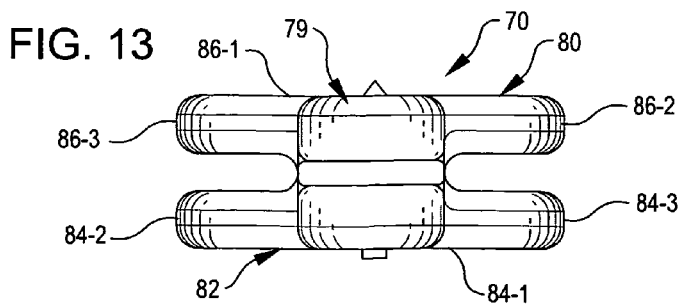

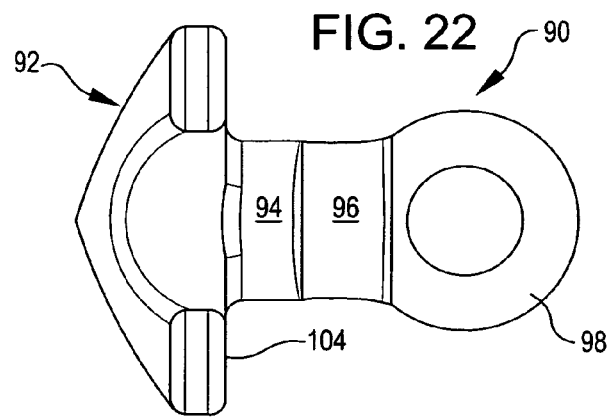
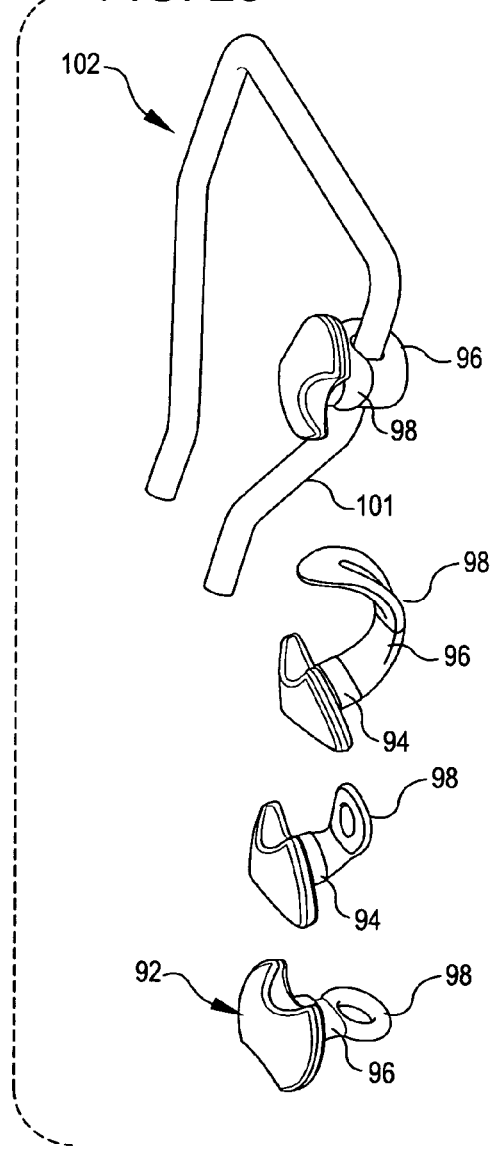

VIBRATION DECAY TIME MODIFICATION

CROSS REFERENCE TO A RELATED APPLICATION

The benefit of the filing date of provisional patent application No. 61/460,569 filed date Jan. 5, 2011 is claimed.

TECHNICAL FIELD OF THE INVENTION

In one aspect the present invention relates to novel, improved vibration decay time modifiers (DTM'S) which can be used to advantage in a host of applications to materially reduce the adverse effects of sound and vibration generated in a device or artifact. In a second aspect, the present invention relates to cross bows equipped with DTM's employing the principles of the present invention.

DEFINITIONS

Mushroom Configuration: one which has: (a) a symmetric or asymmetric head or lobe with a continuous periphery of regular, indented, or other shape; and (b) a stem which is integral with and extends from the head or lobe.

DTM device: one which shortens sound and vibration decay time and thereby reduces the deleterious effects of those phenomena such as user discomfort and equipment damage. In the DTM devices disclosed herein, decay time modification is accomplish by the lengthening, bending, and other distortions of an elastomeric material from which the DTM is made when vibrations are generated in the device or artifact to which the DTM is mounted.

Vibration: a term at times used herein to include both vibrations which are in the audible range (i.e., sound) and those that are not. The term is also intended to encompass those vibrations commonly referred to as shocks.

Wielded Instrument; a device or tool or implement which is handled by a user. The term includes such diverse things as, by way of example only, tool handles, cycles, golf clubs and other sports equipment, and archery bows.

BACKGROUND OF THE INVENTION

U.S. Pat. Nos. 5,362,046 and 6,298,843, both issued to Sims, disclose state-of-the art decay time modifiers which have been successfully employed in a wide variety of applications. The DTM's disclosed in the '046 and '843 patents are limited in application to the extent that they are restricted to use with devices which have a flat surface to, or between which, the DTM or a DTM-supporting mount can be attached.

SUMMARY OF THE INVENTION

Disclosed herein are new and novel DTM'S which can be used in virtually any instance in which they can be slipped onto or trained around an element of a device which vibrates in a manner that one wishes to modify. DTM's of the present invention can optionally be secured in place with a fastener such as a zip tie, a compression elastic band or clamp, a head and slot system, a dovetail and pin arrangement, etc.

DTM's constructed in accord with the principles of the present invention are fabricated from elastomeric materials. They may have a head and stem, a single lobe and stem, multiple lobes separated by one or more integral stems, or a head and one or more lobes, each with an associated stem. Each head or lobe and an associated stem element constitute what is identified in the '046 patent as a mushroom configuration.

When vibrations are set up in the device to which the DTM is mounted, the lobe(s) and/or mushroom head and the associated stem(s) undergo oscillation, fore-and-aft and side-to-side bending, elongation, twisting, contraction, rippling, flopping, and other distortions of the elastomeric material. These motions of the herein disclosed DTM's, as a class, are identified herein by the judicially approved and construed term "wiggle and jiggle". This wiggling and jiggling of the elastomeric material from which the DTM's are made materially reduces the time required for the vibrations to die out. This results in significant advantages, not the least of which are reduced sound and, in the case of a handheld device, a device which is more comfortable to use.

The heads and lobes of the DTM's disclosed herein may be either symmetrically or asymmetrically related to the axial centerline of the DTM. Asymmetrical heads and lobes have the advantage that, in many applications, they can be kept from interfering with the operation of the device.

Cross bow applications are exemplary of those in which the DTM's disclosed herein can be used to particular advantage. Specifically, cross bows are commonly equipped with foot stirrups to facilitate the cocking of the cross bow. The archer places the stirrup on a supporting surface, puts his foot on the stirrup to hold it, and proceeds to cock the bow.

When an arrow (or bolt) is shot from the bow, the stirrup vibrates like a tuning fork, generating significant, and unwanted, sound and vibration. The effects of this sound and vibration is materially reduced by installing vibration DTM's embodying the principles of the present invention on the foot stirrup.

The DTM's of the present invention can of course be used to modify sound and vibration in a host of other devices and artifacts including, but not limited to: handle bars; luggage racks; the shafts of golf clubs and components of other wielded instruments; lawn mowers and edgers; industrial machinery; and bars, pipes, and rods. In actuality, the list is almost endless.

BRIEF DESCRIPTION OF THE DRAWINGS

FIGS. 7-13 are two perspective views and front, top, left-hand, right-hand, and rear views of a second, asymmetric lobe DTM embodying the present invention;

FIGS. 14-22 are four perspective views, a top view, a front view, left-hand and right-hand views, and a bottom view which illustrate a third, in this case symmetric head, embodiment of the invention;

FIG. 23 illustrates the steps employed in attaching a FIGS. 14-22 DTM to a component.

DETAILED DESCRIPTION OF THE INVENTION

Figure 1:
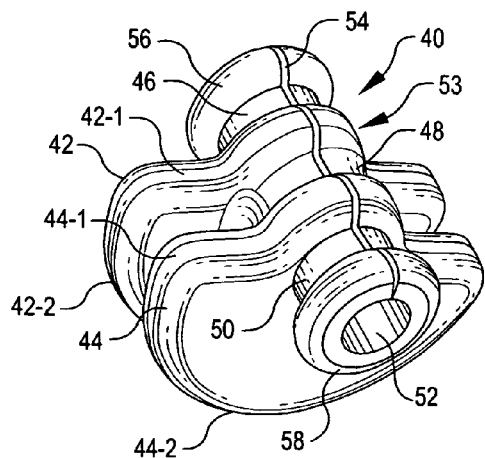
FIGS. 1-6 are, respectively, perspective, front, top, left-hand, right-hand, and rear views of an elastomeric, asymmetric lobe DTM fabricated in accord with, and embodying, the principles of the present invention

FIGS. 1-6 depict a first embodiment of the invention, which is a DTM 40. The DTM 40 has two asymmetric lobes (mushroom heads) 42 and 44 with continuous peripheries that are in part generally straight and in part of an arcuate configuration; integral stems, 46, 48, and 50; and an empty, unobstructed bore 52 extending end-to-end through an integral, axially oriented, stem and lobe—including DTM hub 53, the lobes and stems being centrally apertured to form the bore 52.

The straight segments of the lobe peripheries are identified by reference characters 42-1 and 44-1, and the arcuate segments of the peripheries are identified by reference characters 42-2 and 44-2.

The hollow DTM hub 53 is split (see reference character 54) so that it can be spread apart and DTM 40 installed on a device or artifact (not shown). Once the DTM has been installed, it is secured in place as by installing clamps, elastic bands, zip ties, etc. (not shown) on stems 46 and 50. Flanges 56 and 58 on the outer ends of stems 46 and 50 keep the DTM-securing components from slipping off the stems.

In the lobes and stems 42 . . . 50 of DTM 40, vibrations are dampened by the wiggling and jiggling of the elastomeric material from which DTM 40 is made.

Figure 2:
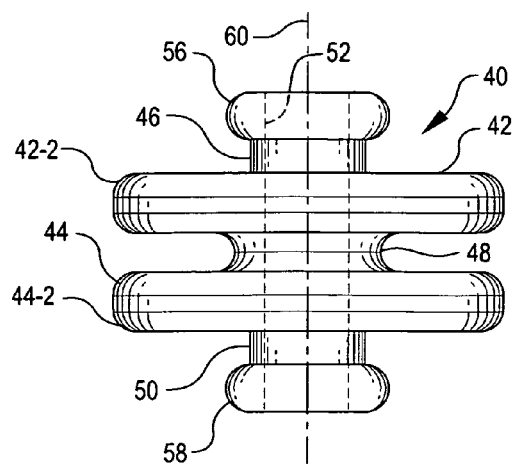
Figure 3:
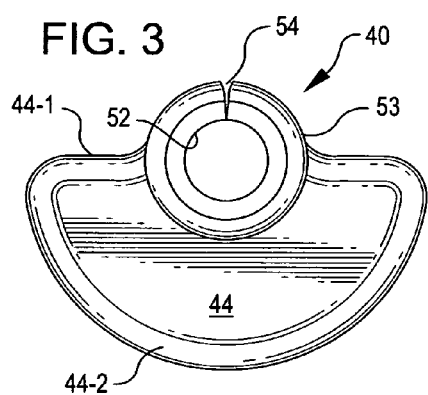
Figure 4:
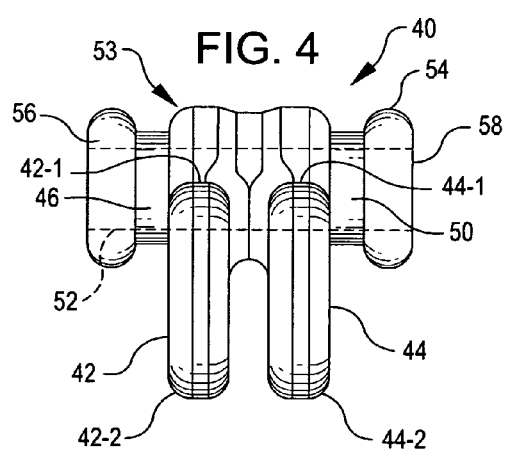
Figure 5:
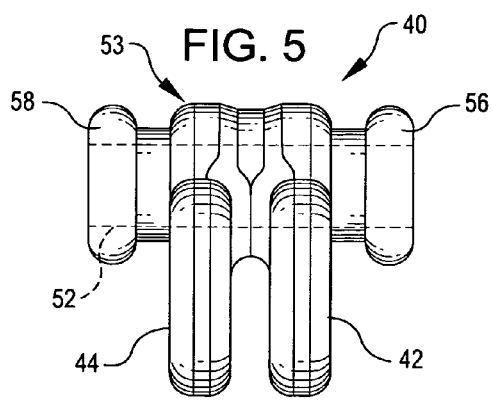
Figure 6:
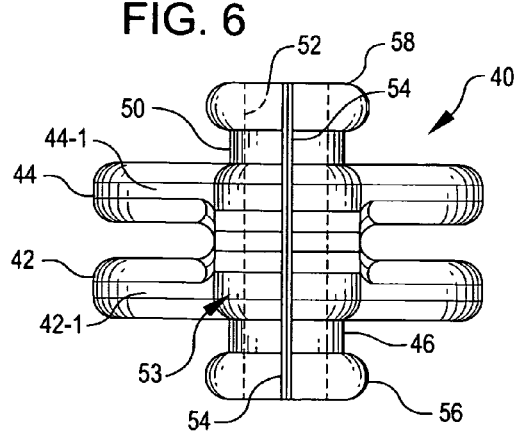
Figure 14:
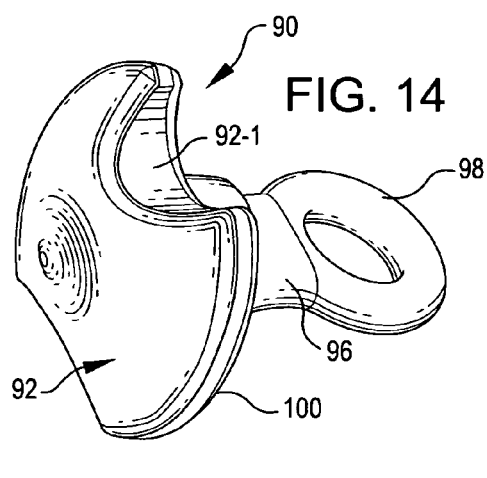
Figure 15:
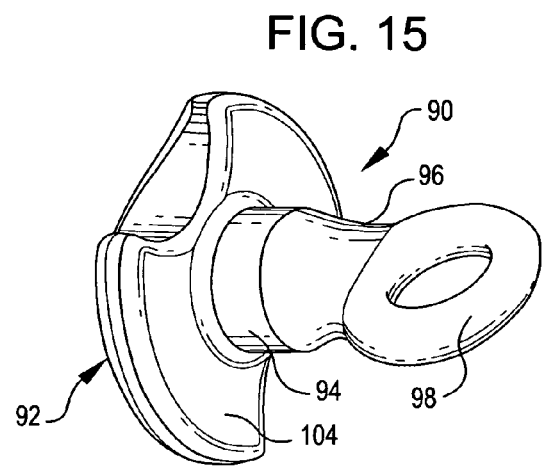
Figure 16:
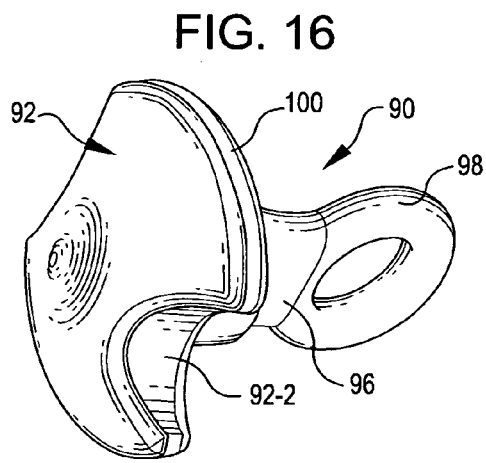
Figure 17:
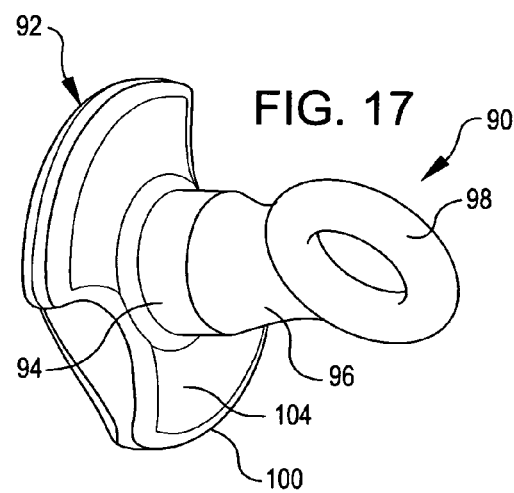
Figure 18:
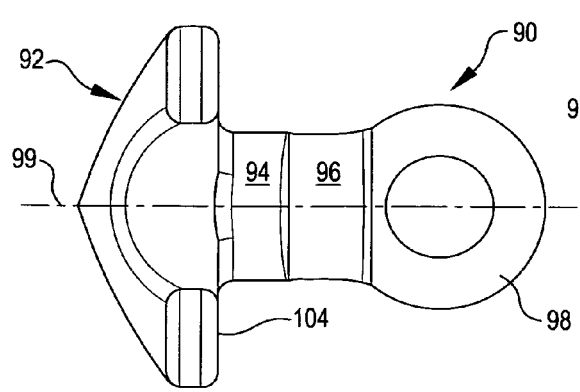
Figure 19:
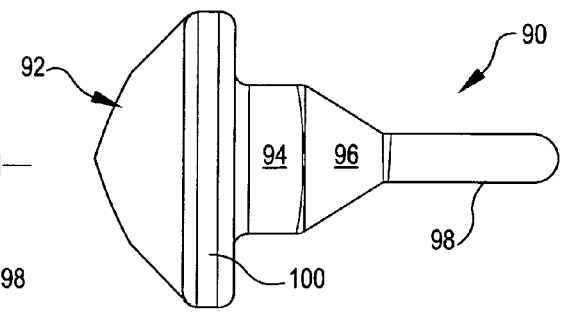
Figure 20:
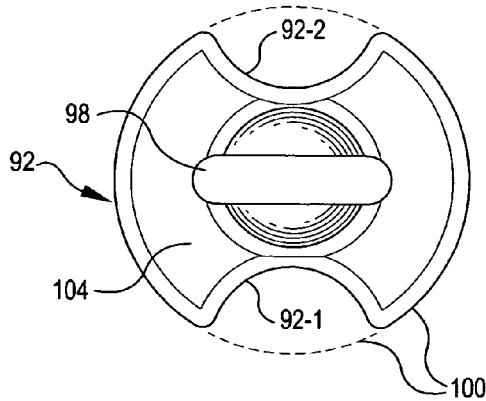
Figure 21:
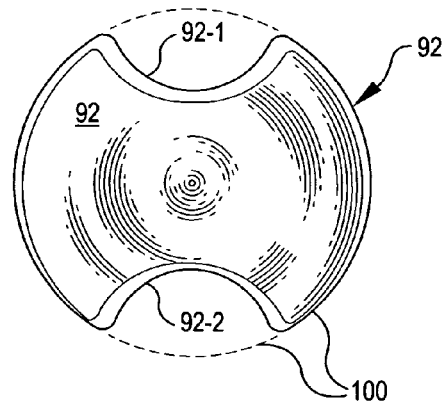
Figure 24:
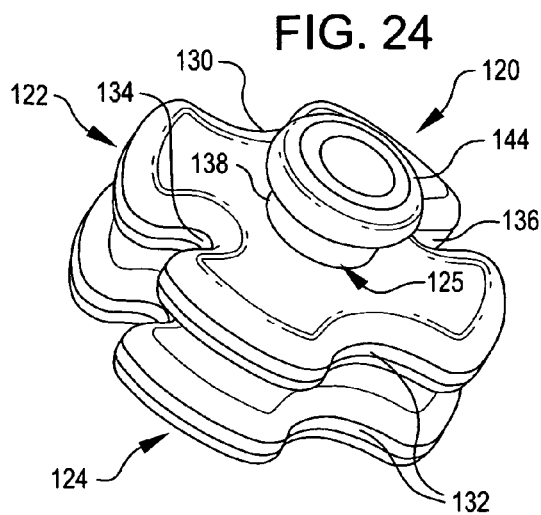
FIGS. 24-29 are, respectively, a perspective view, a front view, a top view, and left-hand and right-hand views of a fourth embodiment of the invention which features multiple, symmetric lobes.
Figure 25:
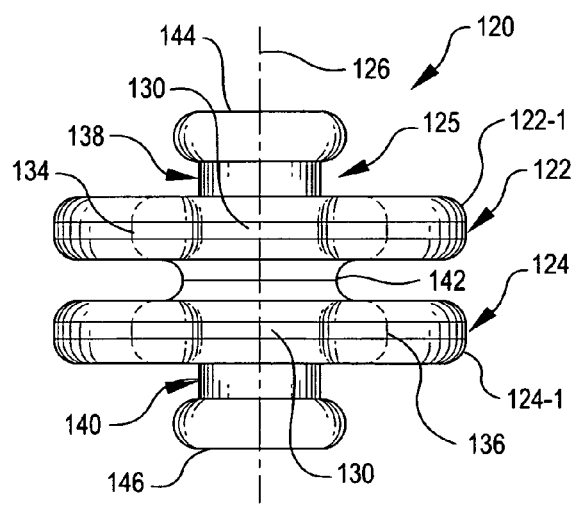
Figure 26:
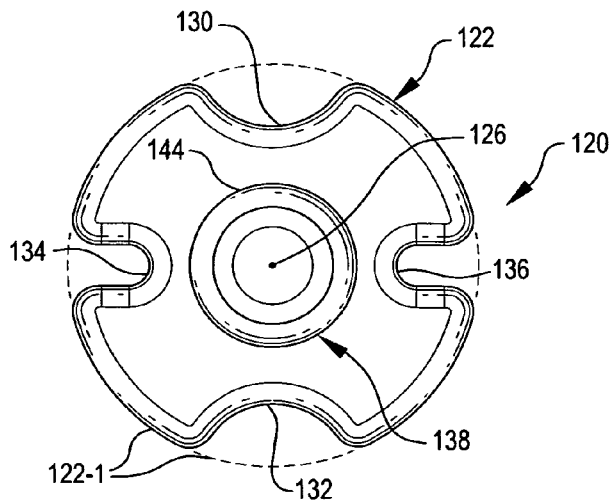
Figure 27:
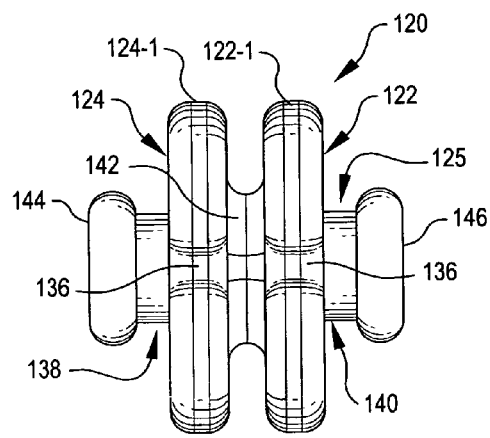
Figure 28:
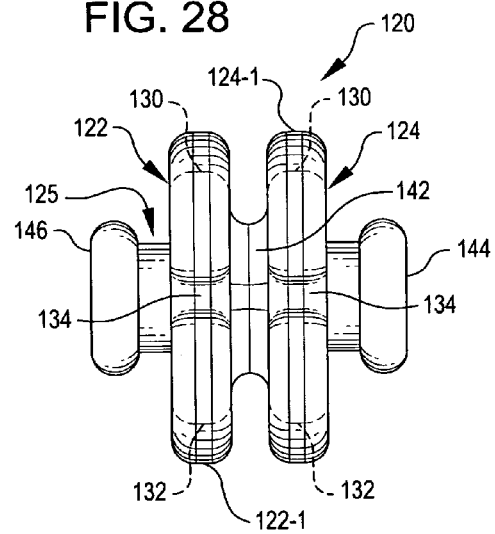
Figure 29:
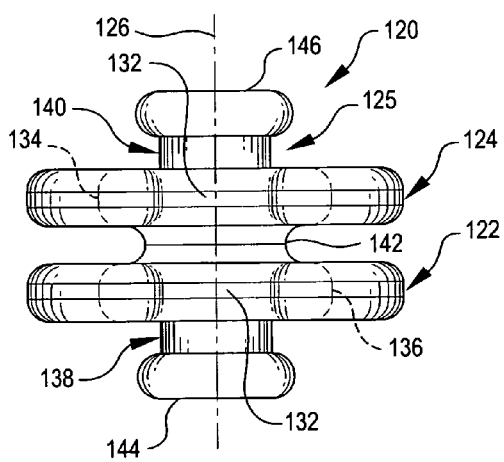

DTM's like the one identified by reference character 40 have the significant advantage that they can by rotated about their axial centerlines (see the axial centerline 60 of DTM 40 in FIG. 2, for example). As pointed out above, this capability, and the asymmetric configuration of lobes 42 and 44, make it possible to rotate the protruding, arcuate segments 42-2 and 44-2 out of the way and thereby keep the lobes 42 and 44 from interfering with the operation of the device to which DTM 40 is mounted.

A second, two-lobe DTM embodying the principles of the present invention is shown in FIGS. 7-13 and identified by reference character 70.

DTM 70 differs from DTM 40 in one respect in that a dovetail 72 and a pin 74 are employed to retain the DTM in place on the device or artifact (not shown) to which it is mounted;

Dovetail 72 has a mortise 76 and a tenon 78 at opposite sides of DTM 70. DTM hub 79, which is split from end-to-end, is spread apart, allowing DTM 70 to be slipped onto a device or artifact. The pressure forcing hub edges 79-1 and 79-2 apart is then released, and tenon 78 slides into mortise 76 as best shown in FIG. 9. Pin 74 is then inserted through the mortise 76 and tenon 78 to fasten the edges 79-1 and 79-2 of DTM hub 79 together and secure DTM 70 to the device or artifact with which is is associated.

DTM 70 also differs from DTM 40 in that its lobes 80 and 82 have integral, continuous, peripheral segments 80-1 and 82-1 that are in part generally arcuate but have centrally located indentations or scallops 84 and 86.

The DTM 70 is a highly efficient shock and vibration dampener. This is attributable in part to the above-discussed, scalloped configuration of arcuate lobe segments 80-1 and 82-1. This scalloped lobe configuration produce lobes having a relatively stiff inner region 84-1 or (86-1) which efficiently dampens vibrations (including shock and sound) that have a high frequency and more flexible, integral outer regions (84-2 and 84-3 or 86-2 and 86-3) which efficiently dampen vibrations with lower frequencies.

In lobes 80 and 82, and in the integral stems 88-1 and 88-2 between those lobes, the scalloped configurations of lobes 80 and 82 described above promote, to an important extent, vibration dampening wiggling and jiggling of the elastomeric material because they have multiple operating modes. Specifically, the inner and outer regions 84-1-84-3 of lobe 80 and 86-1-86-3 of lobe 182 have different sizes and shapes and, consequentially, effectively dampen a particular set of vibrational frequencies or a number of such sets. And the segments are configured to most effectively dampen different sets of vibrational frequencies such that all of the frequencies in a target spectrum are most efficiently dampened.

FIGS. 14-22 depict a DTM which is a third embodiment of the invention and which is identified by reference character 90. DTM 90 has a generally frustoconical mushroom head 92 with a regular periphery, an integral stem 94, and an also integral strap 96 which terminates at an integral loop 98.

Equiangularly spaced apart scallops 92-1 and 92-2 are formed on opposite sides of head 92 in the continuous periphery 100 of the head. Scallops 92-1 and 92-2 are symmetrically located with respect to the axial centerline 99 of DTM 90. As discussed above in conjunction with DTM 70, the scalloped configuration of the continuous periphery 100 promotes the wiggle and jiggle, vibration effecting capabilities of DTM 90, As suggested above, one important use of the present invention is to minimize the vibrations set up in a crossbow stirrup when an arrow (or bolt) is shot from the crossbow. This can be easily and effectively accomplished by mounting a DTM such as the DTM 90 described above to a leg of the crossbow stirrup or, preferably, by mounting such DTM's to both stirrup legs.

The steps involved in doing this are shown in FIG. 23. In that figure, a DTM 90 as disclosed above is shown in the process of being mounted to the leg 101 of a cross bow foot stirrup 102. Specifically, DTM strap 96 is trained around foot stirrup leg 101. Then mushroom head 92 of the DTM is then displaced through loop 98 until the bottom 104 of the mushroom head (see FIG. 15) engages the loop to complete the installation process. The strap 96 is in a stretched condition at this point, and friction therefore keeps DTM 90 from sliding along foot stirrup leg 101.

FIGS. 24-29 depict a fourth embodiment of the invention, a DTM which is identified by reference character 120.

DTM 120 has two lobes 122 and 124 and a hollow, axially extending, DTM-mounting hub 125. Lobes 122 and 124 have circular peripheries 122-1 and 124-1 centered on the longitudinal centerline 126 of the DTM (see the solid and dotted peripheral lines in FIG. 26).

DTM 120 is designed to be slid onto the device or artifact to which it is to be mounted.

The circular periphery 122-1 or 124-1 of each lobe 122 or 124 is interrupted by shallow arcuate scallops 130 and 132 and by U-shaped indentations 134 and 136 that divide each lobe into segments which can move (i.e., wiggle and jiggle) independently and thereby increase the effectiveness of DTM 120 as discussed above in conjunction with DTM 70. Scallops 130 and 132 are spaced 180 degrees apart around the periphery 122-1 or 124-1 of the lobe in which they are formed. Indentations 134 and 136 are also located 180 degrees apart in periphery 122-1 or 124-1, and they are located between and at equal angular distances from scallops 130 and 132.

The DTM 120 also has flanged stems 138 and 140 and a stem 142 between lobes 122 and 124. These stems, together with lobes 122 and 124, make up hub 125.

DTM 120 may be retained in place by friction between it and the device of device component to which it is mounted. Optionally, retainers such as zip ties, cable clamps, elastic bands, etc. (not shown) may be installed on flanged stems 138 and 140 after the DTM has been mounted to the device or artifact. The retainers more securely hold the DTM 120 in place on the device or component to which it is mounted than friction alone does. The flanges 144 and 146 on, and at the exposed ends of, stems 138 and 140 keep the retainers from sliding off the stems.

Figure 30:
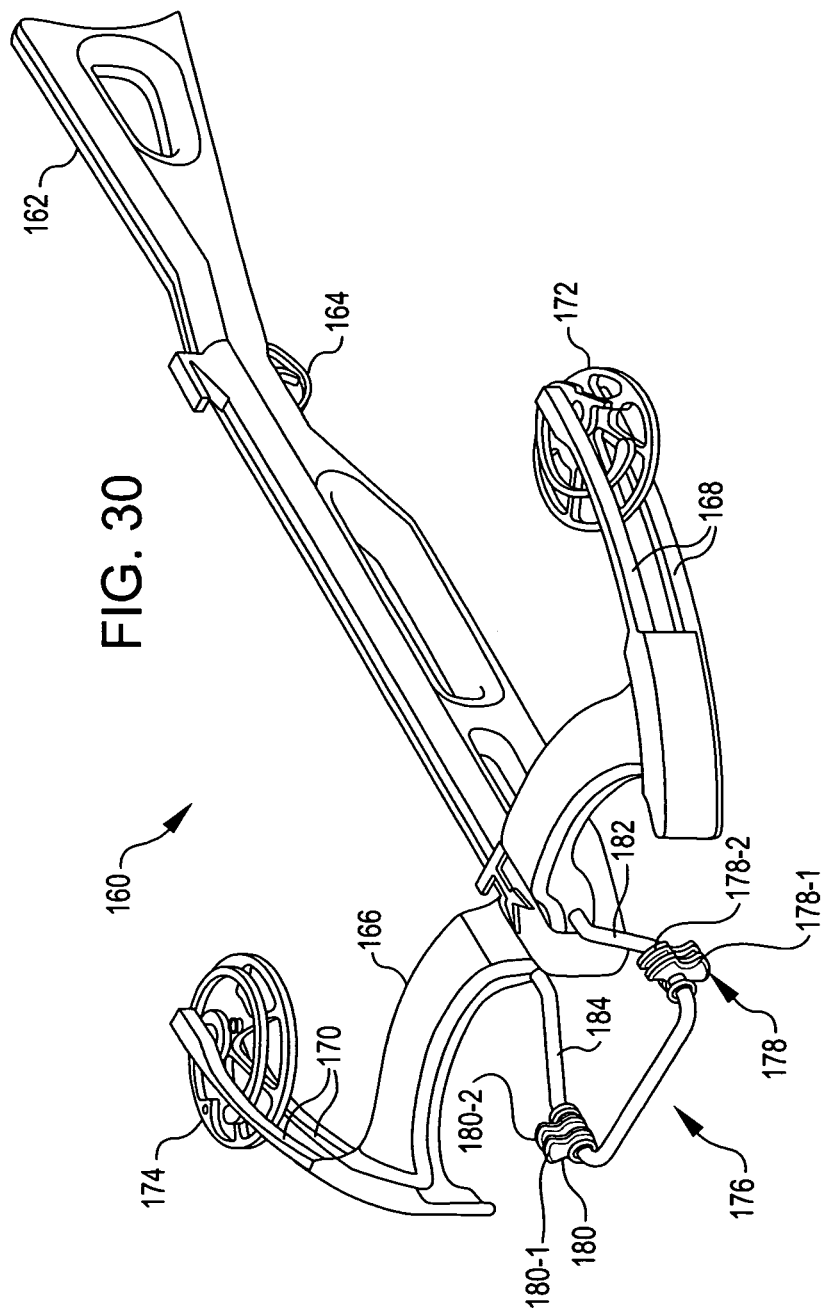
FIG. 30 is a perspective view of a cross bow equipped with DTM's embodying the principles of the present invention to dampen vibrations set up in the crossbow stirrup when an arrow is shot from the crossbow.
Figure 31:
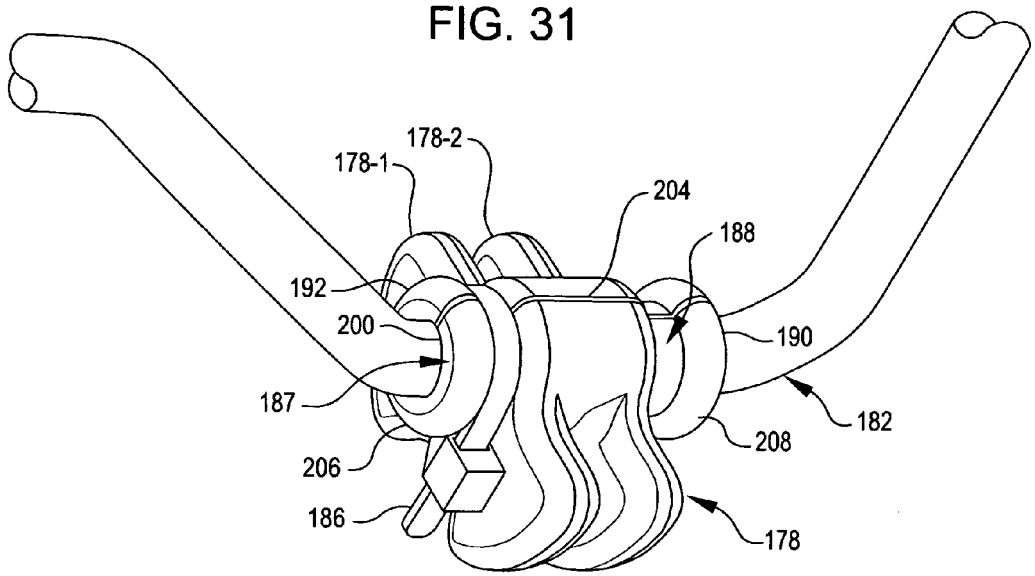
FIG. 31 is a fragment of FIG. 30 drawn to an enlarged scale.
Figure 32:
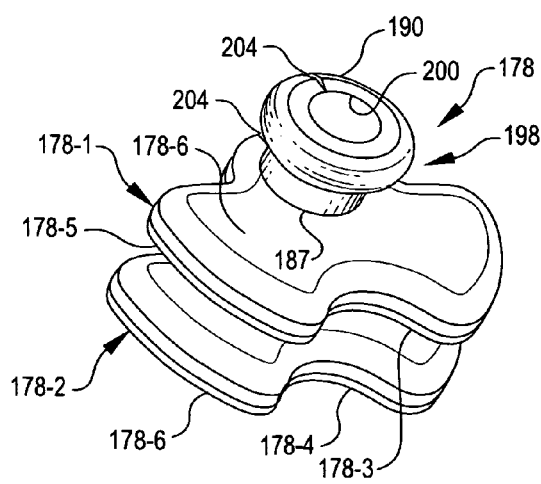
FIGS. 32-37 are, respectively, a perspective view, a front view, a top view, left- and right-hand views, and a rear view of two asymmetric lobe DTM's with which the FIG. 30 crossbow cross bow is equipped; both DTM's are of the same construction and configuration.
Figure 33:
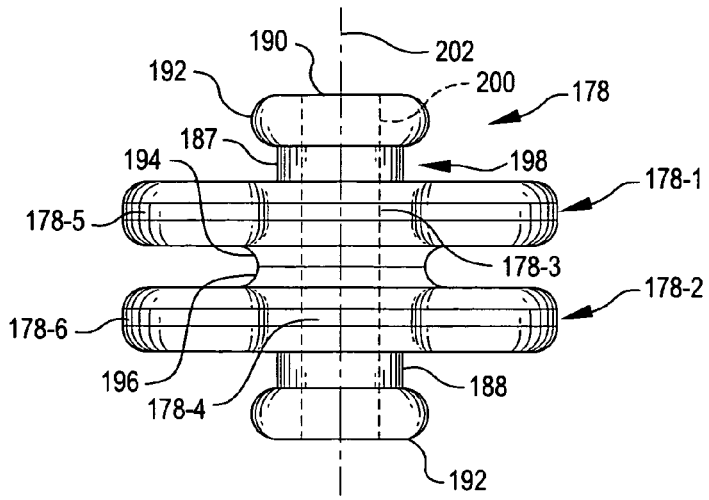
Figure 34:
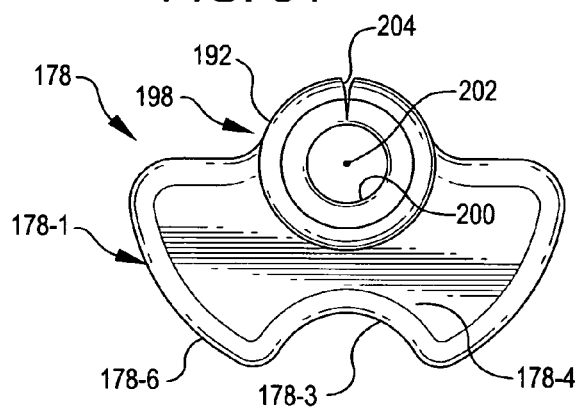
Figure 35:
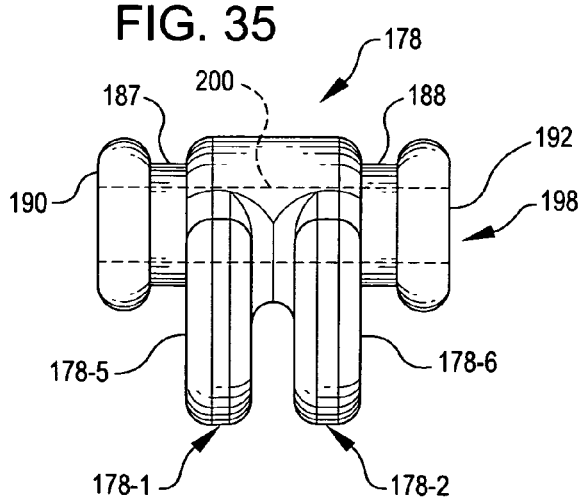
Figure 36:
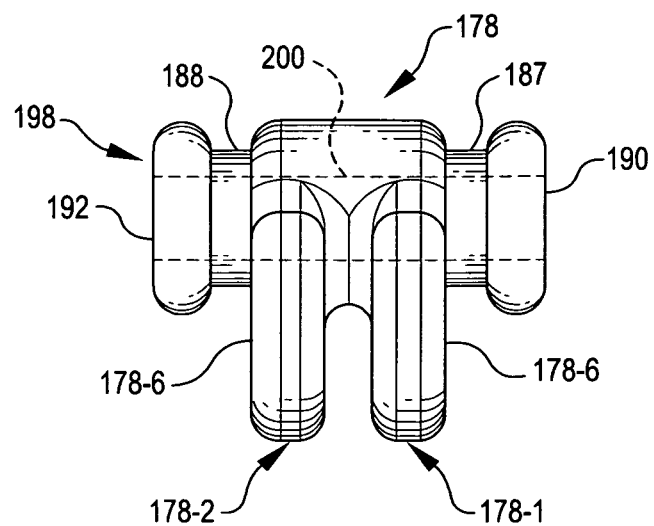
Figure 37:
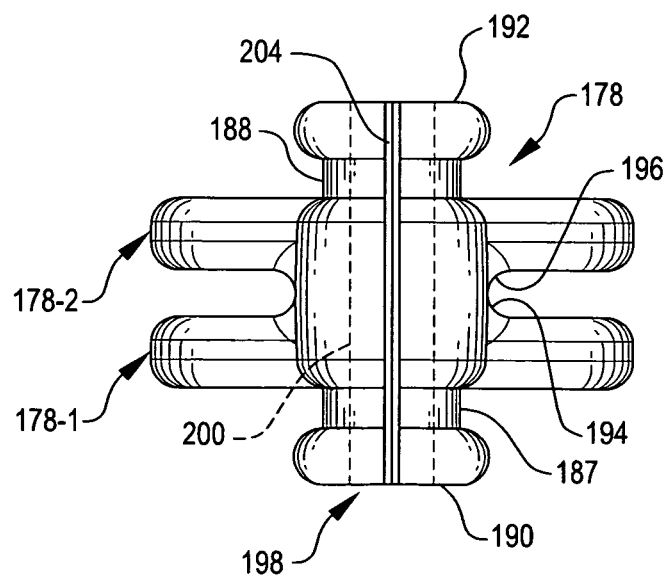

FIGS. 30 and 31 illustrate a crossbow equipped with DTM's embodying the principles of the present invention to dampen vibrations set up in the crossbow stirrup when an arrow is shot from the crossbow.

The crossbow, identified by reference character 160, has the customary stock 162; trigger mechanism 164; riser 166; flexible, riser-mounted limbs 168 and 170; and limb-supported, rotatable cams 172 and 174 of a binary cam system. Riser-mounted foot stirrup 176 facilitates the cocking of the bow, the archer placing his foot in the stirrup to hold the bow fast during the cocking process. DTM's 178 and 180 are installed on the legs 182 and 184 of foot stirrup 176 to modify the decay time of vibrations set up in the stirrup when an arrow (or bolt) is shot from cross bow 160, This reduces the level of sound and the level of vibrations including those in the audible range that may make the bow less than comfortable to shoot. The DTM's 178 and 180 have scalloped lobes 178-1/178-2 and 180-1/180/2. These lobes are purposely located outside the foot stirrup legs to which they are mounted. This keeps the DTM's from interfering when the bowman puts his foot in the stirrup (see especially, FIG. 31).

The scalloped lobes of DTM 178 identified by reference characters 178-1 and 178-2 are best shown in FIGS. 30 and 31, and the similarly scalloped lobes of DTM 180 identified by reference characters 180-1 and 180-2 are best shown in FIG. 30. Reference characters 178-3 and 178-4 identify scallops in the peripheries of arcuate lobe 178 segments 178-5 and 178-6. The scallops in lobes 180-1 and 180-2 of DTM 180 are similarly located and configured.

Shown in FIG. 31 are foot stirrup leg 182, the DTM 178 mounted on that leg, and one of two zip ties used to secure the DTM in place. The zip tie is identified by reference character 186, and it is secured around stem 187 of DTM 178. A second zip tie (not shown) is secured around DTM stem 188. Integral flanges 190 and 192 at the outer ends of stems 187 and 188 keep the zip tie from sliding off the stems.

DTM 180 is assembled in the same manner to the leg 184 of foot stirrup 176 that DTM 178 is mounted to foot stirrup leg 182.

Referring now to FIGS. 30-37, in addition to lobes 178-1 and 178-2 and the outer or end stems 187 and 188 with integral flanges 190 and 192, DTM 178 has integral, inner stems 194 and 196 between lobes 178-1 and 178-2. Lobes 178-1 and 178-2 and stems 187, 188, 194, and 196 are centrally apertured and combine to form an axially extending hub 198 with a central bore 200 which extends from end-to-end through the hub, The hub 198 is concentric with the axial centerline 202 of the hub (see FIGS. 33 and 34).

Hub 198 is split from end-to-end as indicated by reference character 204 in FIG. 31. This allows DTM 178 to be spread apart to install it on foot stirrup leg 182. Then, the forces keeping the DTM 178 spread apart are removed. This allows DTM 178 to relax to the configuration shown in FIG. 31 and grip foot stirrup leg 182. Finally, the zip tie 186 is installed around stem 187, and a second zip tie (not shown) is installed on stem 188 to complete the process of securing DTM 178 to foot stirrup leg 182.

There are a number of elastomeric materials from which the DTM's of the present invention may be fabricated. Appropriate materials are those in the Sims Vibration Laboratory, Inc. NAVCOM® family of elastomers.

The principles of the present invention may be embodied in forms other than those specifically disclosed above and in the drawings. As a single example, DTM's employing the principles of the present invention may have more than two lobes. Therefore, the embodiments presented herein are to be considered in all respects illustrative and not restrictive, the scope of the invention being indicated by the appended claims rather than by the foregoing description and the drawings; and all changes which come within the meaning and range of equivalency of the claims are therefore intended to be embraced therein.

The invention claimed is:

1. An elastomeric decay time modifier (DTM) which has one or more sets of integrated head or lobe and stem elements around a central bore with an axial centerline, wherein the head or lobe elements extend transverse to the axial centerline and wherein the central bore can be installed around or slid onto a device or device component, and then optionally secured to the device or component; and further wherein the central bore is substantially parallel to an axial centerline of the device or device component; at a location at which the DTM is installed on the device or device component and such that the one or more sets of integrated head or lobe elements are transverse to the axial centerline of the device or device component.

2. A DTM as defined in claim 1 in which the head or lobe and stem elements have the capability of reducing vibrations by the wiggling and jiggling of the elastomeric material from which the DTM is made.

3. A DTM as defined in claim 1 which has at least one decay time modifying lobe or head.

4. A DTM as defined in claim 3 in which the periphery of the head or lobe has an asymmetric configuration.

5. A DTM as defined in claim 3 in which the at least one decay time modifying head or lobe has a peripheral configuration that is symmetric relative to a longitudinal axis of the DTM.

6. A DTM as defined in claim 3 in which there is a decay time effecting indentation in the continuous periphery of the at least one decay time modifying lobe or head.

7. A DTM as defined in claim 6 in which the indentation is a scallop or has a U-shape.

8. A DTM as defined in claim 1 which has a hollow hub that is split from end-to-end and allows the DTM to be spread apart and mounted on the device or device component.

9. The combination of a DTM as defined in claim 8 and a fastener surrounding the DTM hub and securing the DTM in place on the device or device component.

10. A combination as defined in claim 9 which has fastener-retaining flanges on outboard ends of the hub.

11. A cross bow which has a foot stirrup and a DTM as defined in claim 1 and further wherein the device or device component is a leg of the stirrup.

12. The combination of a wielded instrument and a DTM as defined in claim 1 mounted to the instrument.

13. An elastomeric decay time modifier (DTM) as recited in claim 1, and further wherein the central bore is concentrically installed around or slid onto the device or the device component.

14. An elastomeric decay time modifier (DTM) which has one or more sets of integrated, centrally apertured, head or lobe and stem elements, the head or lobe and stem elements combine to form a hollow hub with an axial centerline with the head or lobe and stem elements, with the head or lobe elements being generally transverse to the axial centerline, and the hub being so split from end to end that the DTM can be spread open for mounting to a device or a device component with a device or device component axial centerline such that the device or device component axial centerline is substantially parallel with the axial centerline of the hollow hub at a location at which the DTM is mounted to the device or the device component and such that the head or lobe elements are transverse to the axial centerline of the device or device component.

15. The combination of:
a DTM as defined in claim 14; and
a fastener for securing the DTM in place on the device or device component to which the DTM is mounted.

16. A combination as defined in claim 15 wherein:
edges of the DTM hub on opposite sides of the split respectively comprise a mortise and a tenon interlockingly engaged upon the DTM being mounted to the device or device component; and
the fastener comprises a pin displaceable through the mortise and the tenon to lock those DTM elements together.

17. A combination as defined in claim 15 wherein the head and/or lobe elements of the DTM have a continuous periphery with a symmetrical configuration relative to an axial centerline of the DTM.

18. A combination as defined in claim 15 wherein the head and/or lobe elements of the DTM each have a continuous periphery with an asymmetrical configuration.

19. A combination as defined in claim 15 wherein the DTM has multiple, integral lobes.

20. A combination as defined in claim 14:
in which the DTM has first and second, longitudinally extending stems at opposite ends thereof, and
wherein there is a DTM-securing fastener surrounding each of the first and second stems.

21. A combination as defined in claim 20 wherein the first and second DTM stems have integral flanges at exposed ends thereof, the flanges being configured to keep the fasteners from slipping off of those stems.

22. An elastomeric decay time modifier (DTM) as recited in claim 14, and further wherein the hub is concentrically mounted to the device or the device component.

* * * * *